United States Patent (10) Patent No.: US 7,509,056 B2
Le Meur et al. (45) Date of Patent: Mar. 24, 2009

(54) METHOD AND SYSTEM FOR GENERATING CS-RZ PULSES SHOWING NARROW WIDTH OF BIT DURATION

(75) Inventors: Gaelle Le Meur, Marcoussis (FR); Patrick Brindel, Longpont S/Orge (FR)

(73) Assignee: Alcatel, Paris (FR)

( * ) Notice: Subject to any disclaimer, the term of this patent is extended or adjusted under 35 U.S.C. 154(b) by 567 days.

(21) Appl. No.: 11/023,427

(22) Filed: Dec. 29, 2004

(65) Prior Publication Data
US 2005/0201760 A1 Sep. 15, 2005

(30) Foreign Application Priority Data
Mar. 11, 2004 (EP) .................................. 04290658

(51) Int. Cl.
*H04B 10/04* (2006.01)
(52) U.S. Cl. ...................................... 398/183
(58) Field of Classification Search ......... 398/182–201, 398/202–214, 140–172
See application file for complete search history.

(56) References Cited

U.S. PATENT DOCUMENTS 6,323,991 B2 * 11/2001 Cisternino et al. .......... 359/329
6,721,081 B1 * 4/2004 Mauro et al. ................ 359/279
6,809,849 B2 * 10/2004 Akiyama et al. ............. 359/237
7,010,231 B1 * 3/2006 Franco et al. ............... 398/148
7,266,306 B1 * 9/2007 Harley et al. ................ 398/182
7,330,666 B1 * 2/2008 Koley ......................... 398/188
2002/0003641 A1 * 1/2002 Hall et al. ................... 359/122
2002/0024704 A1 * 2/2002 Erdogan et al. ............. 359/156
2002/0141027 A1 * 10/2002 LaGasse et al. ............. 359/237
2003/0189745 A1 10/2003 Kikuchi et al.
2004/0057734 A1 * 3/2004 Igorevich Lakoba ........ 398/192

FOREIGN PATENT DOCUMENTS

EP 1 309 110 A1 5/2003
GB WO 02/071598 A1 * 12/2002

OTHER PUBLICATIONS

Hirano A et al: "40 Gbit/s L-band transmission experiment using SPM-tolerant carrier-suppressed RZ format" Electronics Letters, IEE Stevenage, GB, vol. 35, No. 25, Dec. 9, 1999, pp. 2213-2215, XP006013072.

* cited by examiner

*Primary Examiner*—Quan-Zhen Wang
(74) *Attorney, Agent, or Firm*—Sughrue Mion, PLLC

(57) ABSTRACT

Provided are a method for processing optical signals and a transmitter for the signals adapted for an ultra-high bit rate. The method uses an optical pulse stream with a carrier suppressed return to zero (CS-RZ) format to be obtained from an optical modulator that is driven using a combination of two sinusoidal electrical voltages, one at a frequency f and the other at the third harmonic 3f of the frequency f.

14 Claims, 5 Drawing Sheets

Pulses stream at 4F$_{clock}$ after OTDM (Coding section omitted for demonstration)

METHOD AND SYSTEM FOR GENERATING CS-RZ PULSES SHOWING NARROW WIDTH OF BIT DURATION

TECHNICAL FIELD

The present invention relates to a method for processing optical signals to be transmitted through an optical transmission line using an optical pulse stream with a carrier suppressed return to zero format to be obtained from an optical modulator. Furthermore, it is related to a transmitter for optical signals to be forwarded through an optical transmission line, the transmitter comprising a circuit with an optical modulator for generating an optical pulse stream having a carrier suppressed return to zero format. The invention is based on a priority application EP 04 290 658.6 which is hereby incorporated by reference.

BACKGROUND OF THE INVENTION

In order to improve the quality of Dense Wavelength Division multiplexing (DWDM) transmission dedicated for long haul distances (more than 1000 kilometers), different solutions have been proposed based on the use of modulation format such as Non Return-to-Zero (NRZ), Return-to-Zero (RZ), Carrier-Suppressed Return-to-Zero (CS-RZ), Return-to-Zero Differential Phase Shift Keyed Signals (RZ-DPSK), Phase Shaped Binary Transmission (PSBT) etc. . . . All these techniques try to reduce the impact of propagation effect occurring usually in DWDM environment among other by reducing the spectral width of each channel.

In conventional manner, the power spectrum density of RZ optical signal is relatively broad because of the large number of transitions in the signal to be transmitted. Due to the spread over a wide range of frequencies of the transmitted energy, an RZ signal is sensitive to group velocity dispersion i.e. to chromatic dispersion, and also to four-wave mixing (FWM) or "cross-talk" in DWDM systems. Nevertheless, RZ format presents the advantage of being little affected by self-phase modulation (SPM) in comparison to a NRZ format. It often happens that the SPM induced by optical non-linearities in a line fiber gives rise to optical signal distortion that reduces the range and the capacity of optical transmission systems. In addition, RZ signals are suitable for being regenerated by synchronous modulation.

Conversely, the power spectrum density of a NRZ optical signal is narrower than that of a RZ signal. However, in NRZ format, both capacity and transmission range are limited by SPM. Furthermore, no optical or electronic regenerators exist that are capable of processing such signals at high bit rates. Such signals are not easily integrable and introduce losses because of the interaction between successive "0" and "1" bits, and/or distortion, so that the extinction ratio of the signal after electrical filtering is degraded. There exist also CS-RZ optical signals having the property of presenting bits that are always phase-shifted by 180° relative to adjacent bits. Such CS-RZ signals possess numerous advantages over conventional signals like RZ and NRZ. More particularly, the interaction between adjacent bits are reduced due to the different phase between neighbor bits. Therefore, the use of CS-RZ reduces intrachannel effects, one of the main limitation for optical transmission rates at or above 40 Gbit/s.

In an article entitled "40 Gbit/s L-band transmission experiment using SPM-tolerant carrier-suppressed RZ format", published in Elec. Letters, Vol. 35, No. 25, Dec. 9, 1999, p. 2213 A. Hirano et al. describe using a shifted dispersion optical fiber link in particular, a study of the optimum dispersion stabilities between RZ, CS-RZ, and NRZ signals in the large (L) transmission band at frequencies in the range between 1570 nanometers (nm) to 1605 nm. It appears that CS-RZ signals at 40 Gbit/s present the most stable optimum dispersion and remain the closest to a total dispersion in the vicinity of 0 picosecond per nanometer (ps/nm). Dispersion tolerance is explained in particular by the phase inversion between adjacent bits which eliminates all inter-bit interference. Furthermore, CS-RZ signals subject the sensitivity of the receiver to little degradation at high power. Those results also confirm that CS-RZ signals are less sensitive to SPM than are NRZ signals. In this article, the generator producing the CS-RZ optical signals at 40 Gbit/s comprise a Mach-Zehnder modulator in push-pull mode fed with a sinusoidal electrical signal of 20 gigahertz (GHz). The CS-RZ pulse width takes 66% of the time bit (16.5 ps at 40 Gbit/s). It is usually obtained using half frequency driving (typically 20 GHz) of the modulator biased at the minimum of the transfer curve.

Another type of CS-RZ clock signal generator (transmitter) is based on using a phase modulator to change the phase of each successive bit. Due to their limited passbands, those prior art generators or transmitter do not make it possible, at present, to produce stable CS-RZ signals at a modulation frequency exceeding 40 Gbit/s. In other words, such generators or transmitters are unsuitable for producing CS-RZ signals at very high bit rates.

SUMMARY OF THE INVENTION

In view of the above, it is an object of the present invention to provide a method for processing optical signals and a transmitter for the signals adapted for an ultra-high bit rate without incurring a substantial cost increase.

This object is achieved in accordance with the invention by applying a method for processing optical signals to be transmitted through an optical transmission line using optical pulse stream with a carrier suppressed return to zero (CS-RZ) format to be obtained from at least an optical modulator. That method is characterized by driving the optical modulator with a combination of two sinusoidal electrical voltages, one at some frequency f and the second one at the third harmonic 3 f of such frequency. It is of advantage when applying the method according to the invention, by biasing the optical modulator at the minimum of its sinusoidal transfer function with the excitation voltage obtained from that combination of the two sinusoidal electrical voltages. When using such a method, it may be possible to achieve a final optical pulse stream defined by CS-RZ pulses having a width of approximately 33% of bit duration. It is possible to process such generated optical pulse stream by interleaving at least two of them differing in their polarisation state. Advantageously, it will then be possible to generate an optical pulse stream at frequency almost 2 f. In such a way after applying a bit-to-bit coding scheme to the two optical pulse streams a final bit rate will be achieved which may exceed substantially 40 Gbit/s. It is of advantage when interleaving the two optical pulse streams to choose these two optical pulse streams with different polarisation state possibly perpendicular.

In an embodiment according to the invention, a transmitter for optical signals to be forwarded through an optical transmission line comprises a circuit with at least an optical modulator for generating such optical pulse stream having a CS-RZ format. Such transmitter is characterized in that the optical modulator is driven by a combination of two sinusoidal electrical voltages, one at some frequency f and the second one at the third harmonic 3 f of such frequency.

In an embodiment according to the invention, the transmitter comprises two optical paths for the generation of two optical pulse streams differing in their polarisation state. Each of these optical paths comprises an optical modulator for the insertion of data signal over this transmitted optical light and an optical modulator according to the invention driven by this combination of the two sinusoidal electrical voltages. In another embodiment according to the invention, the transmitter comprises a polarisation separating coupler placed after the optical modulator to divide the optical pulse stream into two optical pulse stream with different polarisation state. These two optical pulse streams will be transmitted on different optical paths while each of theses optical paths comprises an optical modulator for the insertion of data signal over the optical pulse stream. In both embodiments, the two optical paths are converging into a coupler allowing to interleave these two optical pulse streams possibly bit-to-bit.

Advantageous developments of the invention are described in the dependent claims, the following description and the drawings.

DESCRIPTION OF THE DRAWINGS

An exemplary embodiment of the invention will now be explained further with the reference to the attached drawings in which.

DETAILED DESCRIPTION OF PREFERRED EMBODIMENTS

Figure 1B:
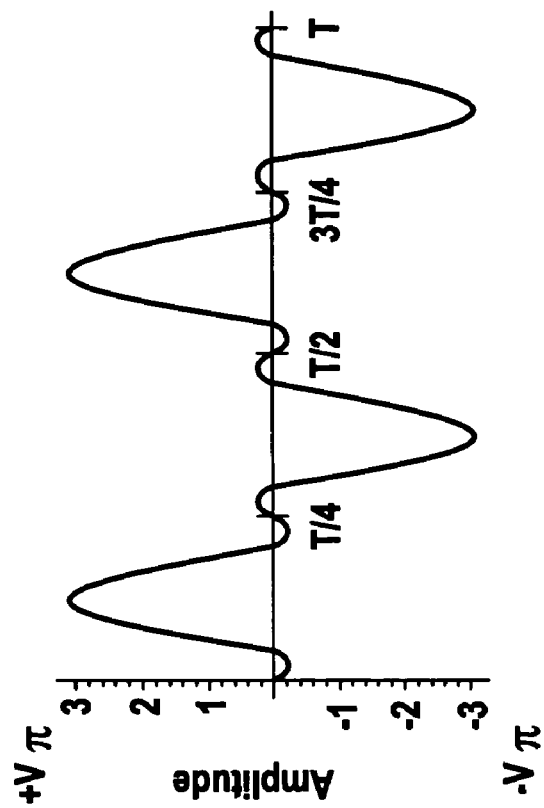
FIGS. 1a and 1b are diagrams of voltage excitation to be used for the optical modulator according to the invention.
Figure 1A:
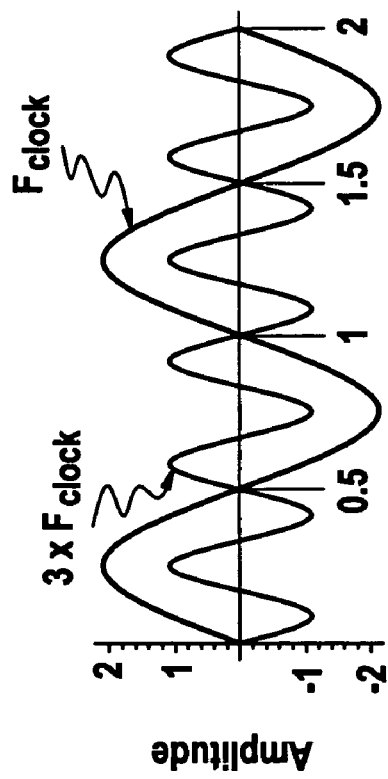

It is proposed in the present invention to apply a method for processing optical signals using an optical pulse stream with a CS-RZ format to be obtained from an optical modulator. Such optical modulator will be driven by a combination of two sinusoidal electrical voltages one at some frequency $f_{clock}$ and the second at the third harmonic of that frequency $3 f_{clock}$. These two sinusoidal electrical voltages are shown on FIG. 1a. And on FIG. 1b is shown the electrical signal shape obtained from that combination and which should be applied to an optical modulator possibly biased at the minimum of its transfer curve usually corresponding to its maximum extension.

As an example, in order to obtain near 16 ps pulse duration at 20 GHz, it is proposed to drive the optical modulator with such a combination of voltages at frequencies equal respectively to 10 GHz and 30 GHz.

Figures 2A, 2B:
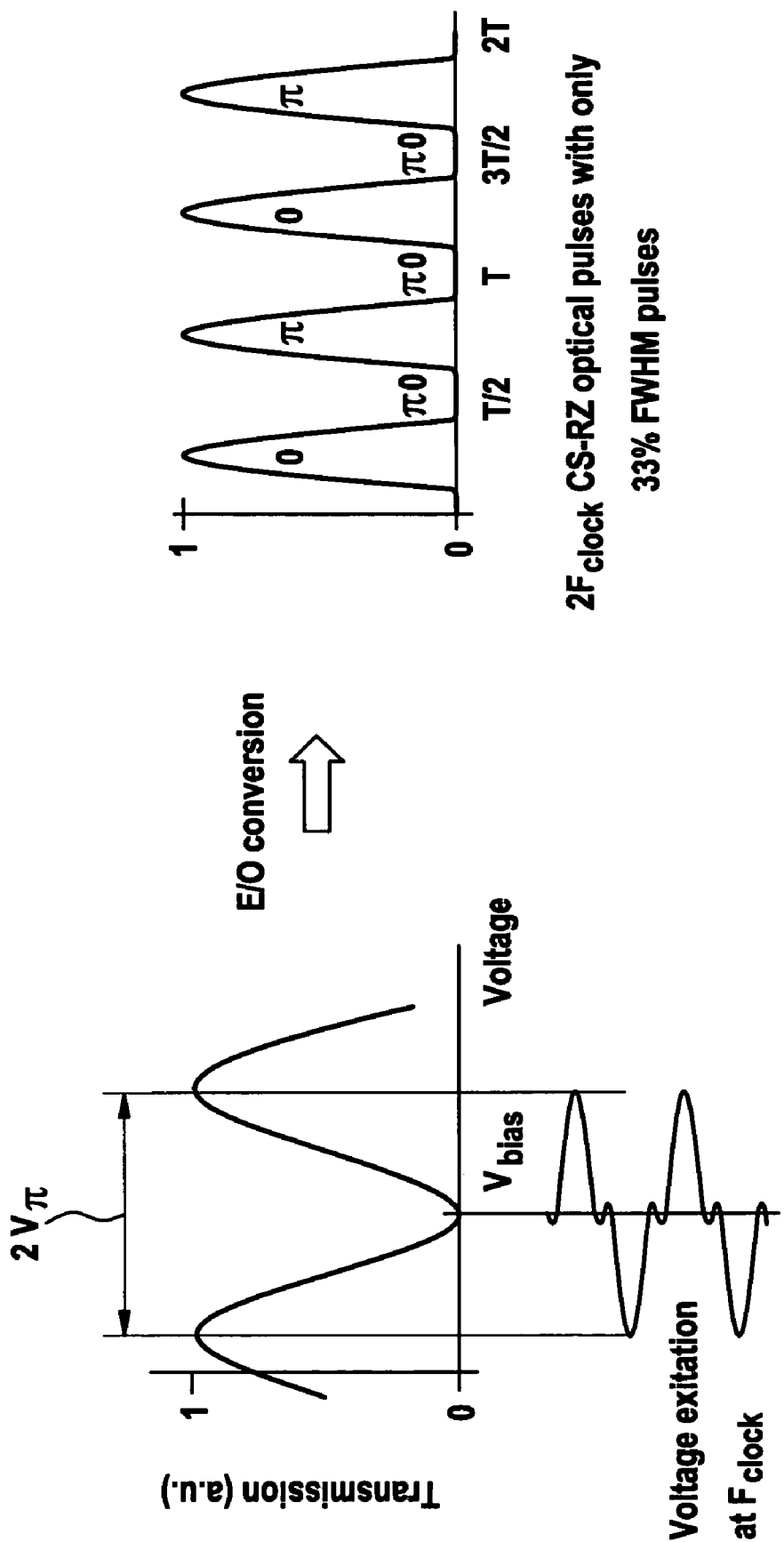
FIGS. 2a and 2b are diagrams of the respectively electrical and optical output of the optical modulator according to the invention.

On FIGS. 2a and 2b are shown respectively the electrical and optical output of the optical modulator possibly a Mach-Zehnder. The optical output is obtained after an electrical to optical conversion. The modulator is biased at the minimum of its sinusoidal transfer function with the excitation voltage corresponding to FIG. 1b.

Figure 3A:
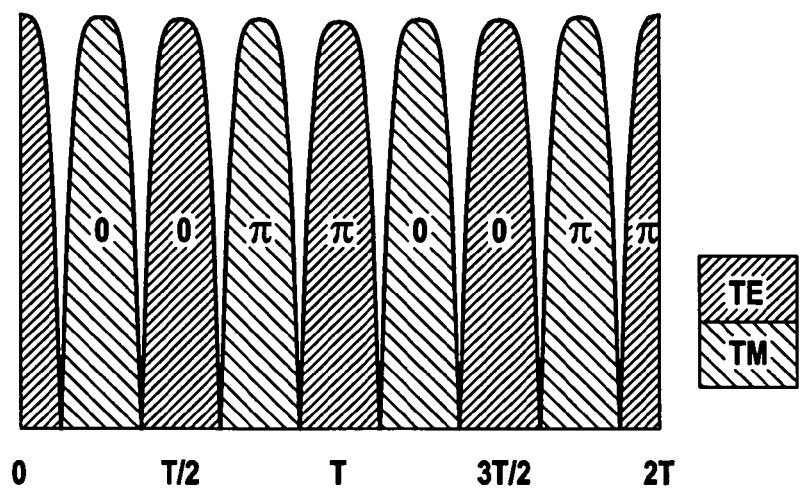
FIGS. 3a and 3b are diagrams of optical pulse streams according to the invention.
Figure 3B:
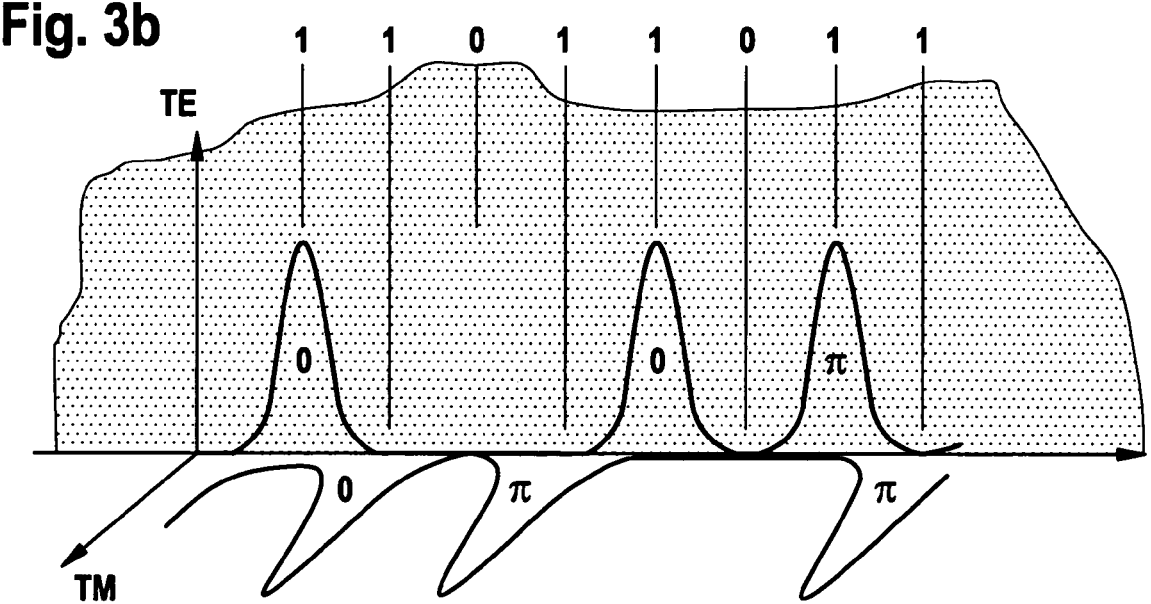

On FIG. 3a is shown the final pulses stream after applying Phase Mixing-Optical Time Division Multiplexing (PM-OTDM) maintaining cross-polarized bit to bit interleaving. On FIG. 3b is shown again more explicitly the association according to the invention of both the bit-to-bit polarisation interleaving technique and the optical phase modulation technique. FIG. 3b is a schematic description of such a modulation format in the optical domain separating the two axis of the light polarisation TE and TM and with mark "0" and ".pi." for coding the optical phase.

Figure 4:
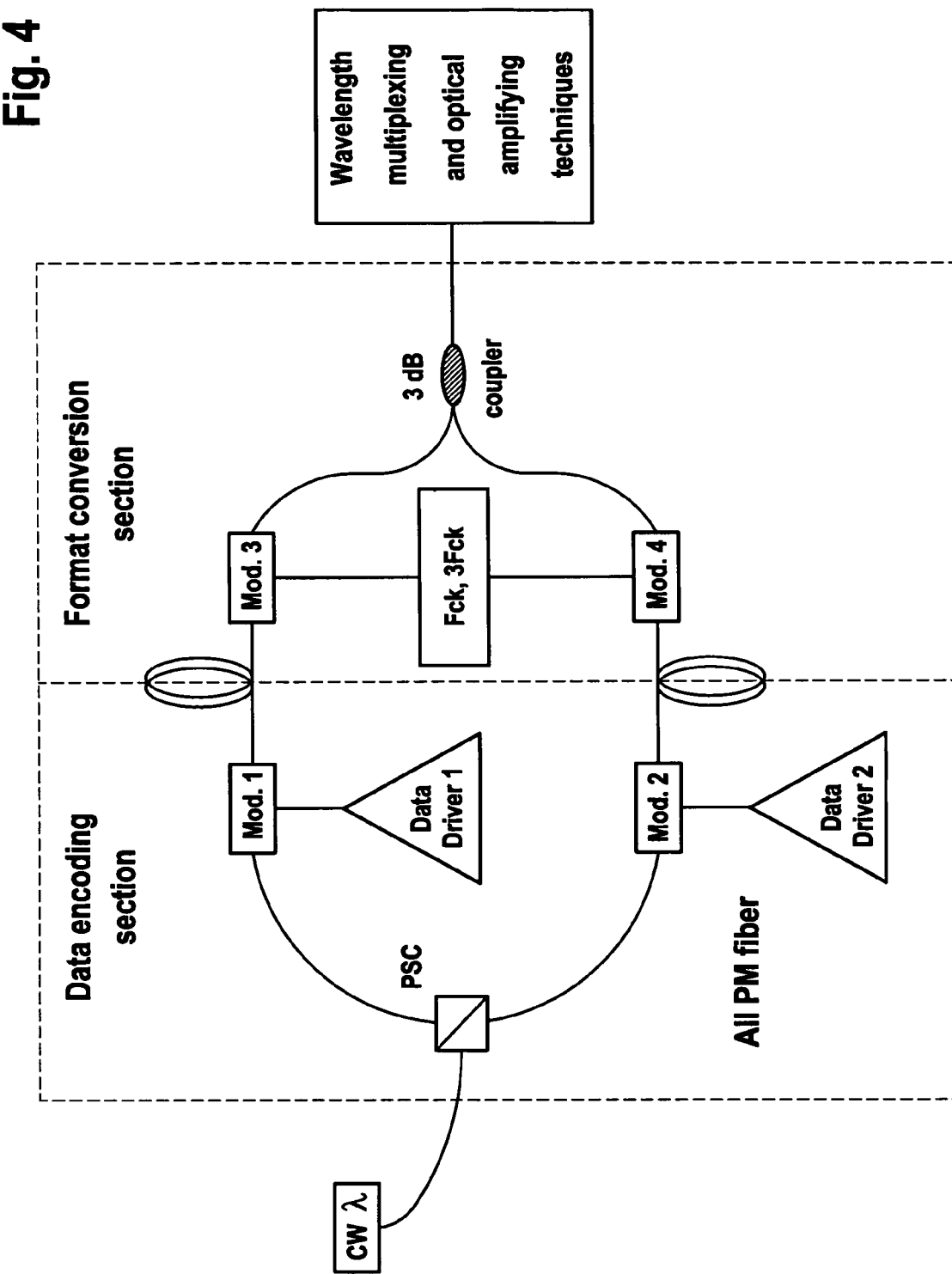
FIG. 4 is a schematic view of a transmitter according to an embodiment of the invention.
Figure 5:
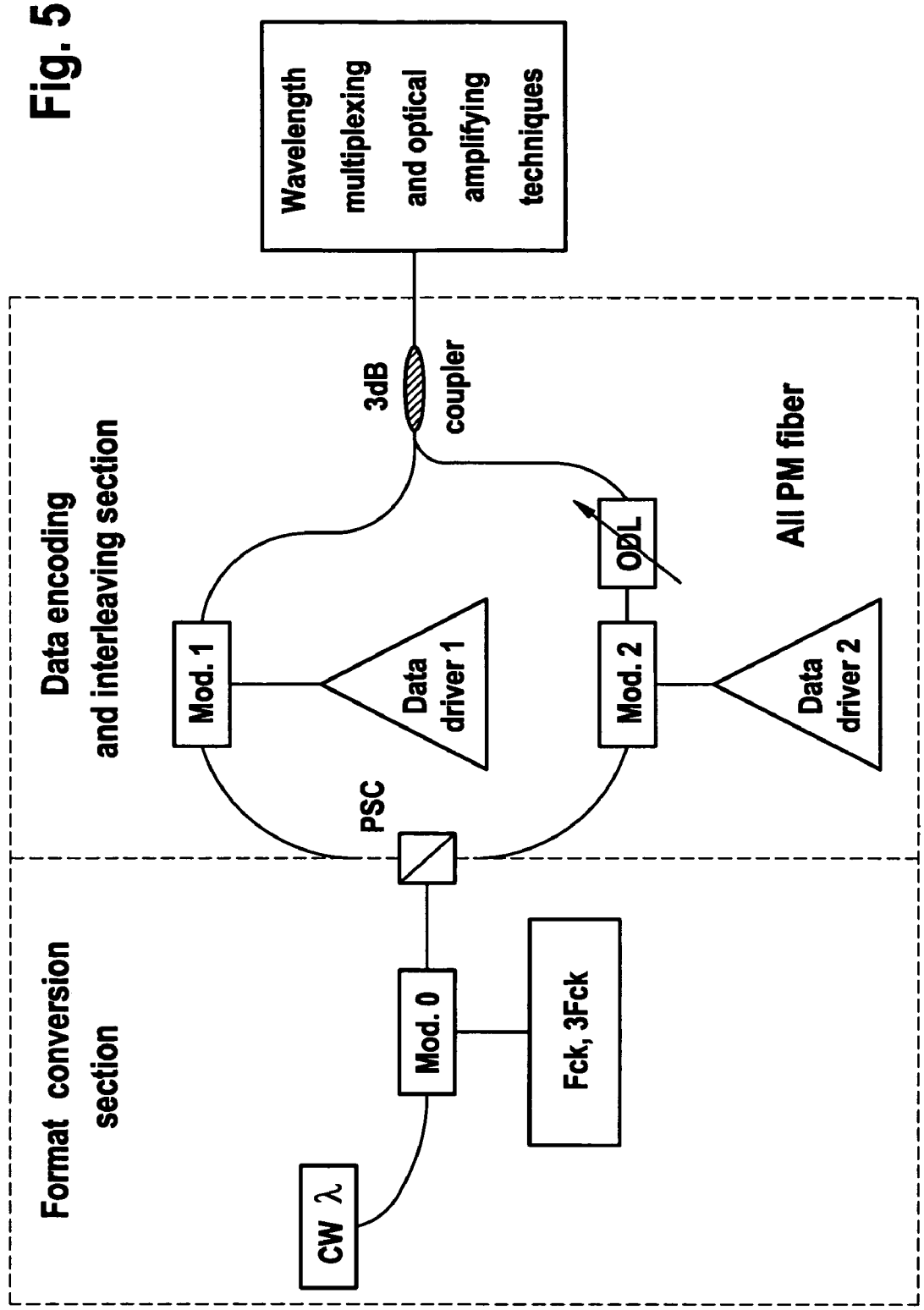
FIG. 5 is a schematic view of another embodiment of the transmitter according to the invention.

On FIGS. 4 and 5 are shown two different embodiments of a transmitter according to the invention. On FIG. 4 the continuous wavelengths are divided in two parts using a polarisation separating coupler (PSC). Mod 1 and Mod 2 are driven at e.g. 20 Gbit/s only with already commercial available drivers producing enough large peak to peak swing voltage well-matched to actual broadband modulators for data coding in NRZ format. The multiplexing electronics is only at 20 Gbit/s which allows improved low cost technology with high integration efficiency and ensuring better control of power consumption. The second stage of the transmitter as shown on FIG. 4 is devoted to the format conversion. The Mod 3 and Mod 4 are driven only using narrow band amplifier at e.g. 10 GHz and 30 GHz. The output amplitude should be two times the voltage of the used optical modulator like a LiNbO.sub.3 Mach-Zehnder modulator (typically 8V).

On FIG. 5 is shown a second embodiment of a transmitter according to the invention. At this second scheme, the number of optical modulator is minimized. This is obtained by applying the combination of the two sinusoidal electrical voltages at frequencies f and 3 f, respectively, on a first modulator Mod 0 provided with continuous wavelengths and only afterwards splitting such obtained optical pulse stream using the PSC. In that case, two optical pulse streams defined by different polarisation states possibly orthogonal (TE, TM) will be forwarded through different optical paths, where each path comprises modulators Mod 1 and Mod 2, respectively. These modulators are used to perform the bit-to-bit coding. An additional optical delay line ODL is required on one of the two optical paths to be able to interleave precisely the two obtained data streams at e.g. 20 Gbit/s. This ODL is not required in the first scheme (FIG. 4) taken into account the possibility to adjust each electronic signal (data or clock) using an electrical delay line.

The combination of the two techniques bit-to-bit polarisation interleaving and alternated phase modulation reduce the intra-channel impairments. The optical spectrum of such a format (33% of final bit duration) is narrower than classical RZ modulation scheme (50% of bit duration) or even than CS-RZ format. In such a way, nonlinear effects as FWM or crosstalk will be significantly reduced which automatically increase efficiency of DWDM transmission.

The invention claimed is:

1. A method for processing optical signals to be transmitted through an optical transmission line, the method comprising:
   inserting a data signal over transmitted optical light using first at least one optical modulator in each of at least two optical paths of the optical transmission line;
   generating at least two optical pulse streams differing in their polarization states and having a carrier suppressed return to zero format by modulating the optical light on said at least two optical paths, over which the data signal is inserted, using second at least one optical modulator which is driven using a combination of two sinusoidal electrical voltage signals comprising a first voltage signal having a frequency f and a second voltage signal having a frequency 3f that is a third harmonic of the frequency f;
   interleaving the at least two optical pulse streams; and
   generating a final optical pulse stream from the interleaving.

2. The method according to claim 1, further comprising biasing the second at least one optical modulator at a minimum of its sinusoidal transfer function with an excitation voltage obtained from the combination of the two sinusoidal electrical voltage signals.

3. The method according to claim 1, wherein the final optical pulse stream is defined by carrier suppressed return to zero pulses having a width of approximately 33% of bit duration.

4. The method according to claim 1, wherein the final optical pulse stream is defined at a frequency of approximately 2f.

5. The method according to claim 4, wherein a bit-to-bit coding is applied to the at least two optical pulse streams to generate the final optical pulse stream.

6. The method of claim 1, wherein the interleaving is performed by using an electric delay line in one of the at least two optical paths.

7. A transmitter for optical signals to be forwarded through an optical transmission line, the transmitter comprising:
- first at least one optical modulator that inserts a data signal over transmitted optical light in each of at least two optical paths of the optical transmission line;
- second at least one optical modulator that is disposed downstream of the first at least one optical modulator and generates at least two optical pulse streams differing in their polarization states and having a carrier suppressed return to zero format by modulating the optical light, over which the data signal is inserted, wherein the second at least one optical modulator is driven using a combination of two sinusoidal electrical voltage signals comprising a first voltage signal having a frequency f and a second voltage signal having a frequency 3f that is a third harmonic of the frequency f, and
- a coupling unit that interleaves the at least two optical pulse streams and generates a final optical pulse stream from the interleaving.

8. The transmitter according to claim 7, wherein the second at least one optical modulator is biased at a minimum of its sinusoidal transfer function with an excitation voltage obtained from the combination of the two sinusoidal electrical voltage signals.

9. The transmitter according to claim 7, wherein the coupling unit interleaves the at least two data streams in a bit-to-bit manner.

10. The transmitter of claim 7, further comprising an electric delay line in one of the at least two optical paths for the interleaving.

11. A transmitter for optical signals to be forwarded through an optical transmission line, the transmitter comprising:
- first at least one optical modulator that generates a first optical pulse stream with a carrier suppressed return to zero format by applying to transmitted optical light a combination of the two sinusoidal electrical voltage signals comprising a first voltage signal having a frequency f and a second voltage signal having a frequency 3f that is a third harmonic of the frequency f;
- a polarisation separating coupler (PSC) placed downstream of the first at least one optical modulator to divide the first optical pulse stream into at least two optical signals with different polarisation states to be transmitted on different optical path;
- second at least one optical modulator that is disposed downstream of the PSC, and generates at least two optical pulse streams with the carrier suppressed return to zero format and the two different polarisation states by inserting a data signal into a respective optical signal of the at least two optical signals divided by the PSC; and
- a coupling unit that interleaves the at least two optical pulse streams and generates a final optical pulse stream from the interleaving.

12. The transmitter of claim 11, further comprising an optical delay line in one of the different optical paths for the interleaving.

13. A method for processing optical signals to be transmitted through an optical transmission line, the method comprising:
- generating a first optical pulse stream with a carrier suppressed return to zero format using first at least one optical modulator that applies to transmitted optical light a combination of the two sinusoidal electrical voltage signals comprising a first voltage signal having a frequency f and a second voltage signal having a frequency 3f that is a third harmonic of the frequency f;
- dividing the first optical pulse stream into at least two optical signals;
- generating at least two optical pulse streams having the carrier suppressed return to zero format and two different polarisation states using second at least one optical modulator by inserting a data signal into a respective optical signal of the at least two optical signals;
- interleaving the at least two optical pulse streams; and
- generating a final optical pulse stream from the interleaving.

14. The method of claim 13, wherein the interleaving is performed by using an optical delay line with respect to one of the at least two optical pulse streams.

* * * * *